United States Patent [19]

Tokuda

[11] Patent Number: 5,016,044
[45] Date of Patent: May 14, 1991

[54] PHOTOGRAPHIC PRINTER EMPLOYING A ROOF-SHAPED REFLECTOR

[75] Inventor: Kanji Tokuda, Kanagawa, Japan

[73] Assignee: Fuji Photo Film Co., Ltd., Kanagawa, Japan

[21] Appl. No.: 475,531

[22] Filed: Feb. 6, 1990

[30] Foreign Application Priority Data

Feb. 6, 1989 [JP] Japan ............................. 1-27287
Feb. 6, 1989 [JP] Japan ............................. 1-27289

[51] Int. Cl.$^5$ ..................... G03B 27/52; G03B 27/70; G03B 27/44
[52] U.S. Cl. ......................................... 355/43; 355/45; 355/66
[58] Field of Search ................ 355/43, 45, 52, 65, 355/66

[56] References Cited

U.S. PATENT DOCUMENTS 2,940,358  6/1960  Rosenthal ........................... 355/66

Primary Examiner—Richard A. Wintercorn
Attorney, Agent, or Firm—Sughrue, Mion, Zinn, Macpeak & Seas

[57] ABSTRACT

A photographic printer having a roof type mirror with a reflection surface of a roof type. The roof mirror is disposed at a 45 degree angle relative to the optical axis of the printing lens. Incident light is reflected twice by the roof mirror, and thereafter it reaches either a photosensitive material disposed at the focal plane of the printing lens, or a monitor screen. The roof mirror reverses the right and left sides of an image so that the right and left sides of an image projected upon the monitor screen or photosensitive material are the same as those of an original image of the photographic film. In a preferred embodiment, when the roof type mirror is inserted within the printing optical path, the light reflected by the roof type mirror reaches a first exposure station, and when the roof type mirror is retracted from the printing optical path, the light passed through the printing lens reaches a second exposure station.

13 Claims, 8 Drawing Sheets

PHOTOGRAPHIC PRINTER EMPLOYING A ROOF-SHAPED REFLECTOR

BACKGROUND OF THE INVENTION

The present invention relates to a photographic printer, and more particularly to a photographic printer wherein a roof type reflector is disposed within a printing optical path to project an image recorded on photographic film onto a monitor screen or directly onto a photosensitive material while maintaining the right and left sides of the projected image the same as those of the original image.

Conventional photographic printers have been either a non-reflect type having a linear printing optical path, or a reflect type having an L-shaped printing optical path. FIG. 9 shows an example of a non-reflect type photographic printer having a linear printing optical path 3. A photographic film, e.g., a negative film 1, set on a film carrier 7 is disposed facing a photosensitive material. e.g., a color paper 4. A printing lens 2 is interposed therebetween so that an image recorded in the negative film 1 is printed on the color paper 4. FIG. 10 shows an example of a reflect type photographic printer whose printing optical path 6 is L-shaped. A flat mirror 8 slanted at a 45 degree angle is disposed between a taking lens 5 and a color paper 4.

The negative film 1 is set on the film carrier 7 of the non-reflect type photographic printer shown in FIG. 9, with its front surface. i.e., its photosensitive emulsion layer, facing toward the color paper 4. On the other hand, with the reflect type photographic printer shown in FIG. 10, the negative film 1 is turned upside down on the film carrier 7, i.e., with its photosensitive emulsion layer facing a light source 9, because an image projected upon the color paper has its right and left sides reversed by the mirror 8.

At a laboratory using these two types of photographic printers, it becomes necessary to change the set conditions of a negative film 1 on the film carrier 7 in accordance with the type of a photographic printer, resulting in a possibility of erroneous setting of the negative film 1 by an operator.

A photographic printer of the type shown in FIG. 9 also may be equipped with a monitor to check a trimming condition. FIG. 11 shows such a photographic printer with a monitor. This printer has a transparent type monitor screen 10 and a mirror 11 which is inserted into the printing optical path 3 during a trimming operation. While observing the monitor screen, the operator moves the film carrier 7 holding a negative film 1 on a work bench 12 thereby to adjust the trimming area within the image frame. During photographic printing, the mirror 11 is retracted from the printing optical path 3, and the desired trimming area is enlarged by a printing lens 13 and projected onto a color paper 4.

However, with this photographic printer/monitor combination, the image displayed on the monitor screen through the mirror 11 is reversed between the right and left sides thereof relative to those of the image of the negative film. As a result, if the film carrier 7 is moved in the right direction, the image displayed on the monitor screen 10 moves in the left direction. These opposing motions of the negative film 1 and the image on the monitor screen 10 are confusing to an operator and can make practical operation inconvenient.

SUMMARY OF THE INVENTION

In view of the foregoing, it is a principal object of the invention to provide a photographic printer capable of reducing erroneous loading of a photographic film.

It is another object of the invention to provide a photographic printer which makes it easy, even for a novice, to perform trimming by making the motions of a photographic film and a monitor image be in the same direction.

In order to achieve the above and other objects and advantageous effects of this invention, a roof type reflector having a roof (i.e., an inverted V-shape) reflection surface is slanted at a 45 degree angle relative to the optical axis of a printing lens. The image on a photographic film is projected onto a photosensitive material positioned at the focal plane of the printing lens, or onto a transparent monitor screen after being reflected by the roof type reflector.

With the reflect type photographic printer using the roof type reflector, the right and left sides of an image are reversed so that the front/back surface of a photographic film can be set on the film carrier in the same manner as with a conventional photographic printer having a linear printing optical path. Therefore, if the reflect type photographic printer of this invention is used by a laboratory having a non-reflect type photographic printer without a mirror, the loading direction of a photographic film can be made the same for both the printers, thereby eliminating erroneous loading of a photographic film and hence eliminating back-surface printing.

For the case of a photographic printer with a monitor having a roof type reflector, the direction of motion of a photographic film set on the film carrier is the same as that of an image on the monitor screen. thereby allowing easy trimming even by a beginner. Since this photographic printer is of a non-reflect type, it is obvious that a photographic film can be set on the film carrier with its photosensitive emulsion layer facing the photosensitive material or print paper.

According to a preferred embodiment of this invention, when the roof type reflector is inserted into the printing optical path, a light reflected by the roof type reflector reaches a first exposure station, and when the roof type reflector is retracted from the printing optical path, a light passed through the printing lens reaches a second exposure station. Provision of two exposure stations allows the use of two different sizes and types of photosensitive materials, so that two different sizes of prints can be readily produced with a single photographic printer.

BRIEF DESCRIPTION OF THE DRAWINGS

The above and other objects and advantages of this invention will become apparent from the following detailed description when read in connection with the accompanying drawings, wherein.

DETAILED DESCRIPTION OF THE PREFERRED EMBODIMENTS

Figure 1:
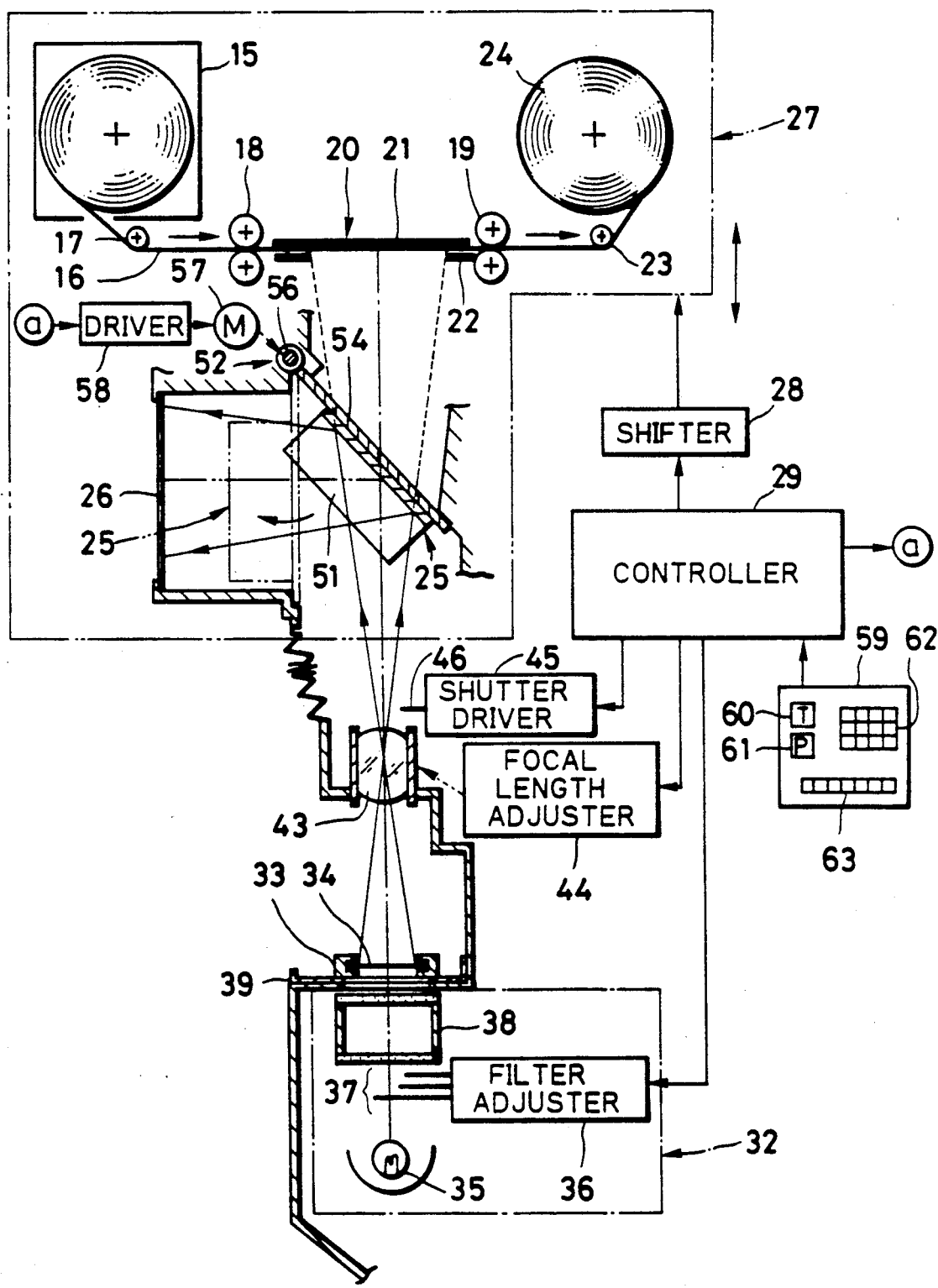
FIG. 1 is a schematic and block diagram of a photographic printer with a monitor according to an embodiment of this invention.

Referring to FIG. 1, a color paper 16 is wound in a roll and housed within a magazine 15. This color paper 16 is pulled out from the magazine 15, one frame after another, via a guide roller 17 upon rotation of a pair of feed rollers 18 and 19, and is set at an exposure station 20. It is known to provide, at the exposure station, a plate 21 for attracting and flattening a color paper 16 and a paper mask 22. After being exposed at this exposure station 20, the color paper 16 is fed via a pair of feed rollers 19 and guide roller 23 and is wound in an exposed roll 24. A paper feed system constructed of the exposure station 20, a feed roller pair 18 and 19 and the like, and a monitor screen 26 and the like (to be described later) are formed in a unit as a paper deck 27. The paper deck 27 is adapted to move up and down by a shifter 28 and to be set at a predetermined position by a controller 29 to be described later, in accordance with a printing magnification factor.

A light source unit 32 is disposed under the paper deck 27. A printing light from this light source unit 32 illuminates a photographic film such as a negative film set on a film carrier 22 from the back surface thereof. The light source unit 32 is constructed of a light source 35 for emitting white light, three color filters 37 for adjusting the intensity of the white light and the ratio of three colors, a filter adjuster 36 for adjusting the set positions of the color filters, and a diffusion box 38 for diffusing printing light from the color filters uniformly. The film carrier 33 is adapted to move freely in two dimensions on a trimming work bench 39 so that an operator can determine the trimming area by setting the film carrier 33 at a desired position.

Figure 2:
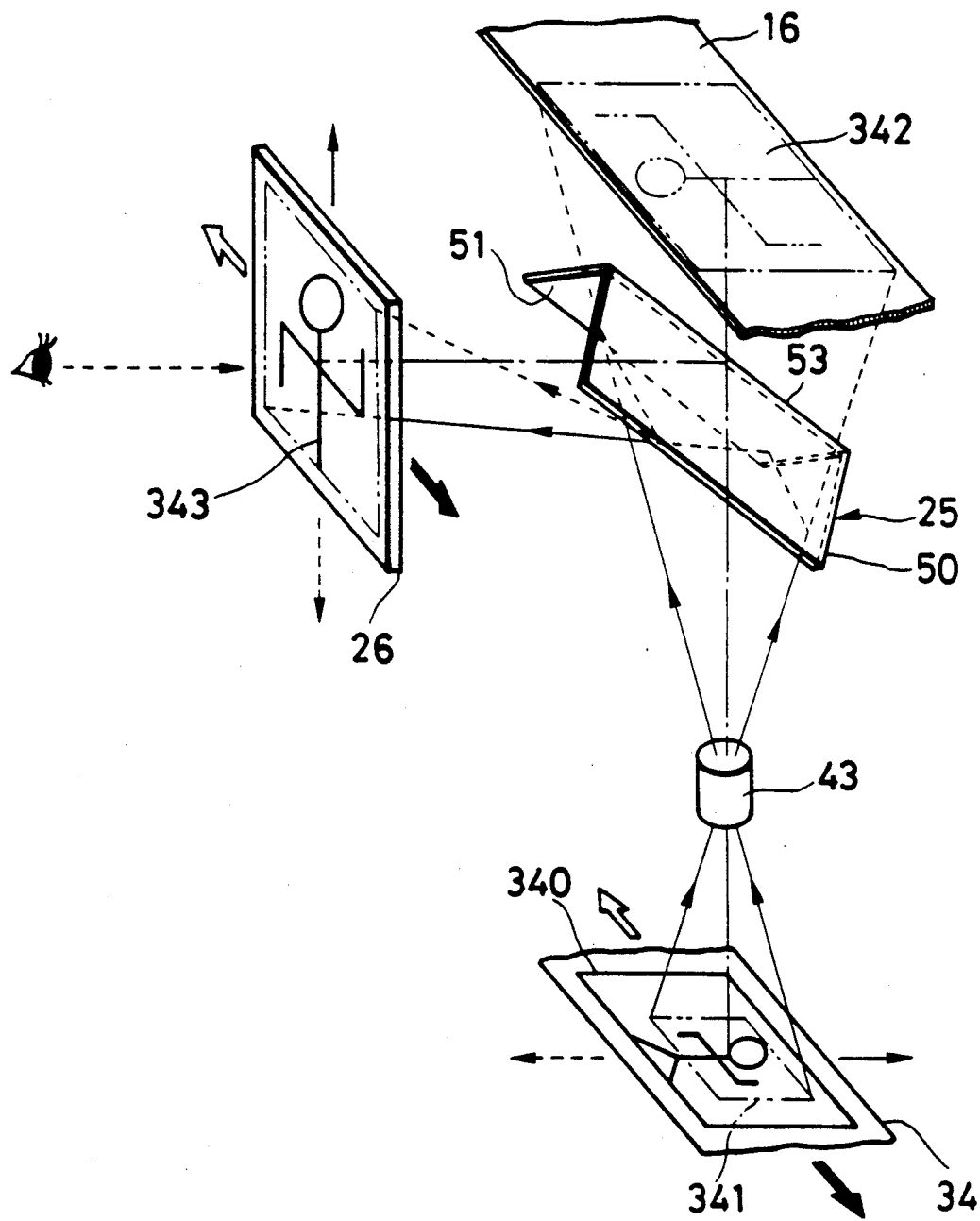
FIG. 2 is a schematic diagram showing images on a negative film, monitor screen and color paper.

During normal printing, the whole area of one frame of the negative film 34 is enlarged by the printing lens 43 and is focussed on a partial area of the color paper set at the exposure station 20. During trimming printing, as shown in FIG. 2, an image within a selected trimming area 341 in a frame 340 is enlarged and printed on the color paper 16. The focal length of the printing lens 43 is adjusted by a focal length adjuster 44 at a particular printing magnification factor designated at the time of trimming. A shutter 46, driven by a shutter driver 45, and a roof type, or inverse V-character shaped, mirror 25 are disposed between the printing lens 43 and color paper 16.

As shown in FIG. 2, the roof type mirror 25 is constructed of two flat mirror sections 50 and 51 with their mirror surfaces directed inside and slanted at a 90 degree angle with respect to each other. As shown in FIG. 1, the roof type mirror 25 is set selectively by a pivot device 52 either at a set position (indicated by a solid line in FIG. 2) in the printing optical path, or at a retract position (indicated by a chain line in FIG. 1) retracted from the printing optical path. As shown in FIG. 2, at the set position, the ridge 53 of the roof type mirror is slanted by 45 degrees relative to the printing optical path to deflect the printing light by 90 degrees. The light reflected by the roof type mirror 25 reaches the monitor screen 26 disposed perpendicularly to the exposure station 20 so as to display on the monitor screen 26 an image 343 which is the same in its right/left side and up/down side as those of the image 342 to be printed on the color paper 16. In particular, since the image within the trimming area 341 is reflected twice at the two flat mirror sections 50 and 51, the right/left side of the image is displayed correctly. Therefore, the image 343 displayed on the monitor screen 26 takes the same relative positions as those of an image within the trimming area 341. Accordingly, the motion of the image on the monitor screen tracks the motion of the trimming work bench 39 of the film carrier 33 holding the negative film 34, allowing easy work during trimming. The roof type mirror 25 is connected fixedly to a mirror holder 54 which moves during printing to the position indicated by a two-dot chain line to intercept any light incident from the monitor screen 26.

The pivot device 52 is constructed of a rotary shaft 56 coupled to the mirror holder 54 and a pulse motor 57 for rotating the shaft by a predetermined angle. The pulse motor 57 is controlled by the controller 29 via a driver. The controller 29, constructed of a known microcomputer, controls sequences of photographic printing in accordance with a program stored in a memory. The controller 29 is connected to a keyboard 59. This keyboard 59 is provided with a trimming start key 60, print start key 61, numerical keys 62 for entering a printing magnification factor, the number of prints, exposure condition correction data and the like, and other various control keys 63.

The operation of the photographic printer shown in FIGS. 1 and 2 now will be described. For trimming printing, first the trimming start key 60 is activated, and then the numerical keys 62 are activated to enter a printing magnification factor. Upon activation of the trimming start key 60, the controller 29 causes the driver 58 to rotate the motor 57, thereby inserting the roof type mirror 25 into the printing optical path. Next, the controller 29 obtains the focal length of the printing lens 43 and the set position of the exposure station 20. In accordance with the obtained focal length, the focal length adjuster 44 operates to change the focal length of the printing lens 43, and in accordance with the set position it controls a shifter 28 to adjust the position of the paper deck 27. If a zoom lens is used as the printing lens 43, it is unnecessary to move the paper deck 27.

For trimming printing, while monitoring the monitor screen 26, an operator moves the film carrier 33 along the surface of the trimming work bench 39 to determine the trimming area 341. In this case, since the roof type mirror 25 is set within the printing optical path, the image on the frame 340 illuminated with the light source unit 32 is reflected twice by the flat mirror sections 50 and 51 of the roof type mirror 25. As a result, as shown in FIG. 2, the monitor image 343, which is the same as the trimming area 341 as viewed from the left side of FIG. 1, is displayed on the monitor screen 26.

After the determination of the trimming area, the print start key 61 is activated so that the controller 29 causes the pivot device 52 to retract the roof type mirror 25 from the printing optical path. The roof type mirror 25, retracted to the position indicated by the two-dot-chain line, shields the monitor optical path so that light incident from the monitor screen is intercepted and will not cause flare. The controller 29 also operates to cause the filter adjuster 36 to adjust the positions of the inserted color filters in accordance with the large area transmittance density (LATD) of the frame 340, to adjust the intensity and color balance of light emitted from the light source 35. Thereafter, the shutter 46 is opened for a predetermined time to print the image within the trimming area 341 on a partial area of the color paper 16 by means of the printing lens 43. Next, the color paper 16 is advanced by one frame to set the unexposed area thereof at the exposure station 20. The negative film 34 also is advanced by one frame to set the next frame at the printing station, and the roof type mirror 25 again is set within the printing optical path.

For normal printing, the printing lens 43 is set at a standard focal length to print the whole area of one frame on the color paper 16. In this case, since the monitoring is not required, the roof type mirror 25 remains retracted at the position indicated by the two-dot-chain line. Obviously, even during normal printing, the roof type mirror 25 may be set within the printing optical path to monitor the frame to be printed.

Figure 3:
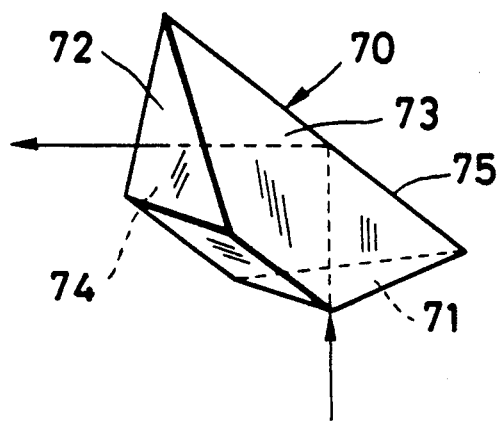
FIGS. 3 to 5 are perspective views showing other embodiments of the roof type reflector.

As shown in FIG. 3, the roof type reflector may include a prism 70 which is formed by cutting opposite end surfaces 71 and 72 of a triangle pole having a right isosceles triangle section at a 45 degree angle. In this case, the two reflection planes 73 and 74 are coupled at right angles at the roof ridge 73 which is disposed at a 45 degree angle relative to the printing optical path.

Figure 4:
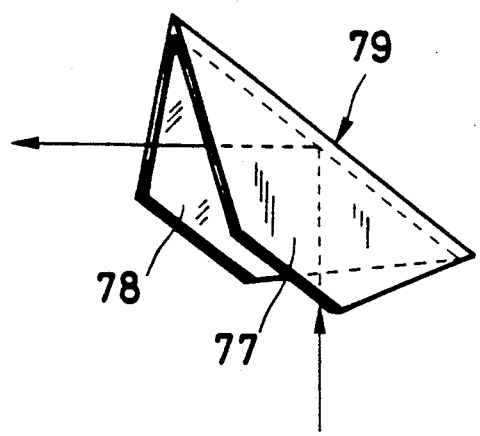
Figure 5:
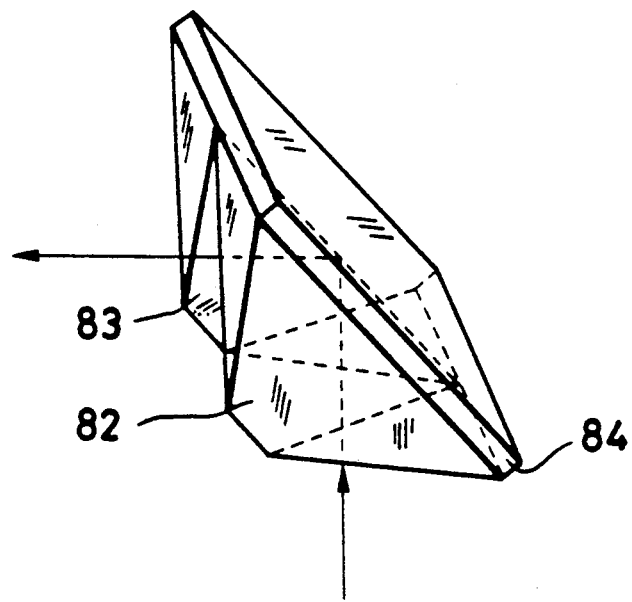

Also, as shown in FIG. 4, a roof type reflector 79 may include two trapezoidal mirrors 77 and 78 with their mirror surfaces directed inwardly and their bottom edges coupled together at right angles. Further, as shown in FIG. 5, the roof type reflector may be formed by fixedly coupling two prisms 82 and 83 side by side to a support plate 84, the opposing planes of the prisms 82 and 83 being used as the reflection planes.

Figure 6:
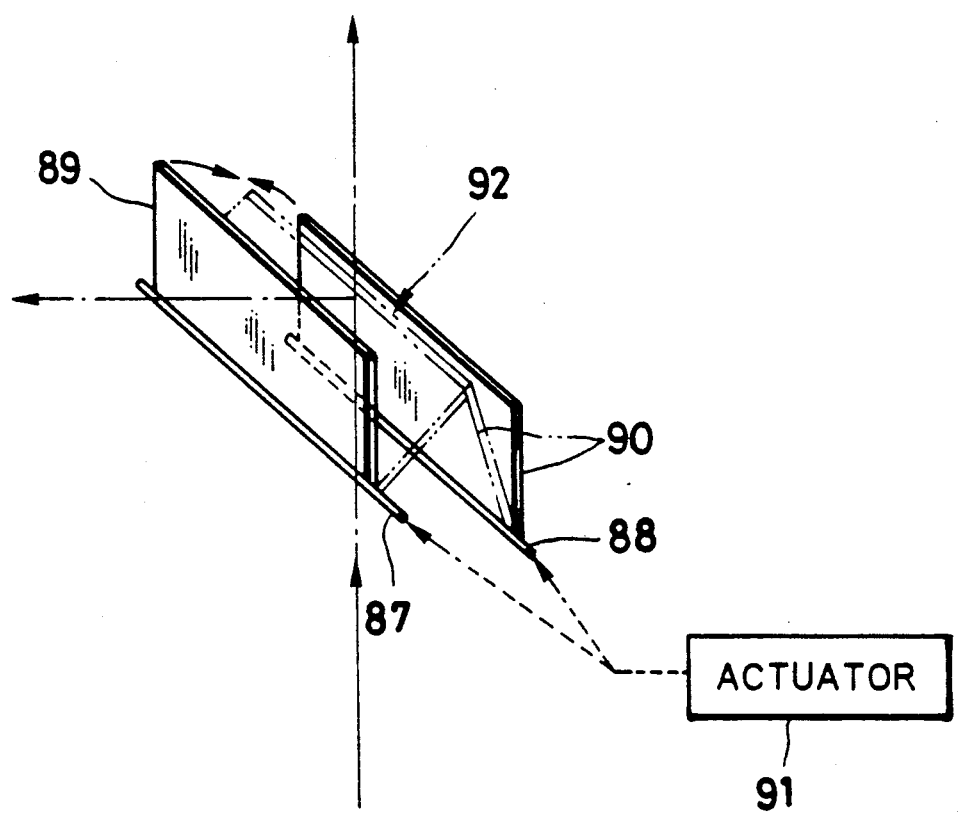
FIG. 6 is a perspective view showing an embodiment of the roof type reflector constructed of two rotatable flat mirrors.

In the above embodiment, the roof type mirror 25 is rotated about the rotary shaft 56 to retract it from the printing optical path. Instead of this arrangement, another embodiment constructed as shown in FIG. 6 also may be used. This embodiment includes two flat mirrors 89 and 90 which rotatable about respective shafts 87 and 88. During monitoring, the flat mirrors 89 and 90 are rotated by an actuator 91 at right angles to form a roof type mirror 92 represented by two-dot-chain lines. During printing, the flat mirrors 89 and 90 are rotated by the actuator 91 by 45 degrees to take upright positions so as to retract the mirrors from the printing optical path. Instead of the pivot device 52 and actuator 91, a shifter may be provided to move the roof type reflector in a parallel manner into and out of the printing optical path.

Figure 7:
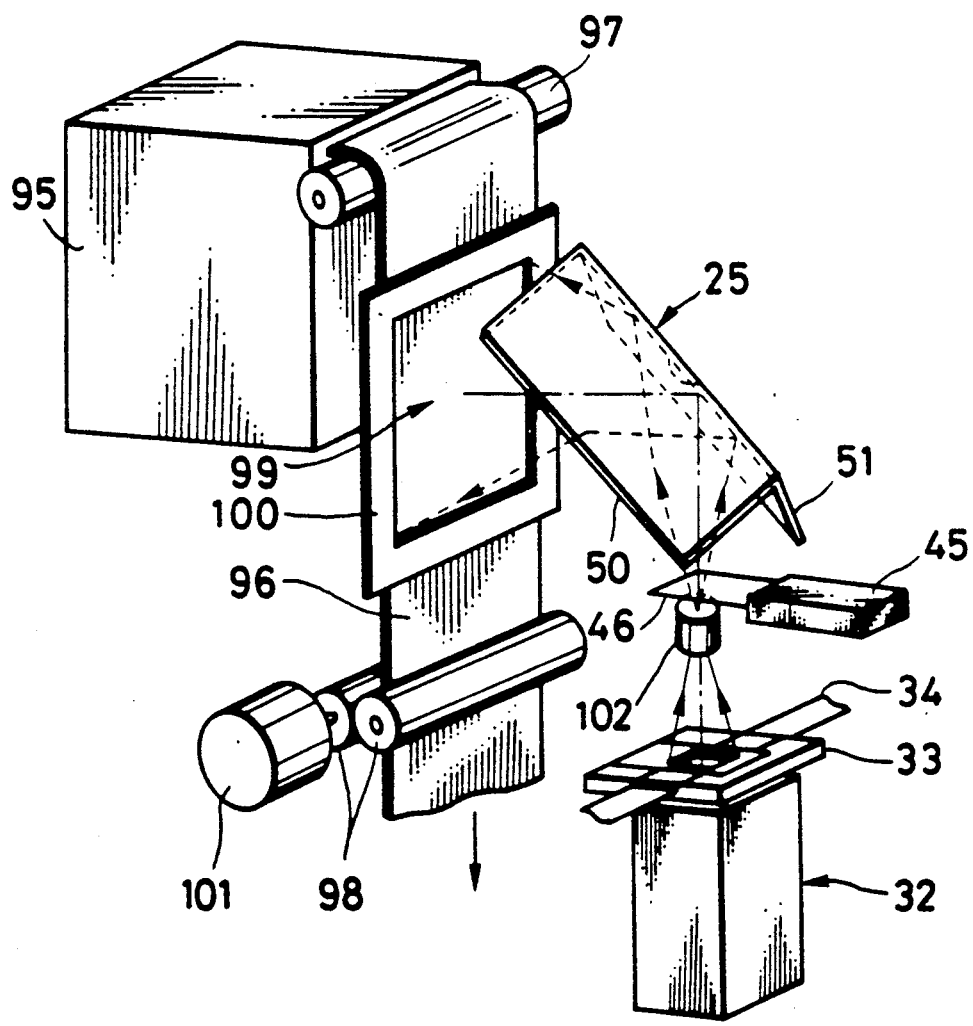
FIG. 7 is a perspective view showing the reflect type photographic printer using a roof type reflector according to the present invention.

FIG. 7 shows the reflect type photographic printer using the roof type reflector, wherein elements substantially similar to those shown in FIG. 1 are represented by identical reference numerals. A color paper 96 wound in a roll within a magazine 95 is nipped with a pair of feed rollers 98 via a guide roller, is fed in the vertical direction, and then is set at an exposure station 99. The exposure station 99 is mounted vertically and has a paper mask 100. The feed roller pair 98 is rotated by a pulse motor 101.

Printing light emitted from a light source unit 32 passes through a negative film 34 and printing lens 102 and reaches a roof type mirror 25. The printing light is reflected twice by the roof type mirror 25 and is deflected laterally so as to be incident on part of the color paper 96 set at the exposure stage 99. In this embodiment, no monitoring system is provided, so that the ridge of the roof type mirror 25 is connected fixedly at a 45 degree angle relative to the printing optical path.

Figure 9:
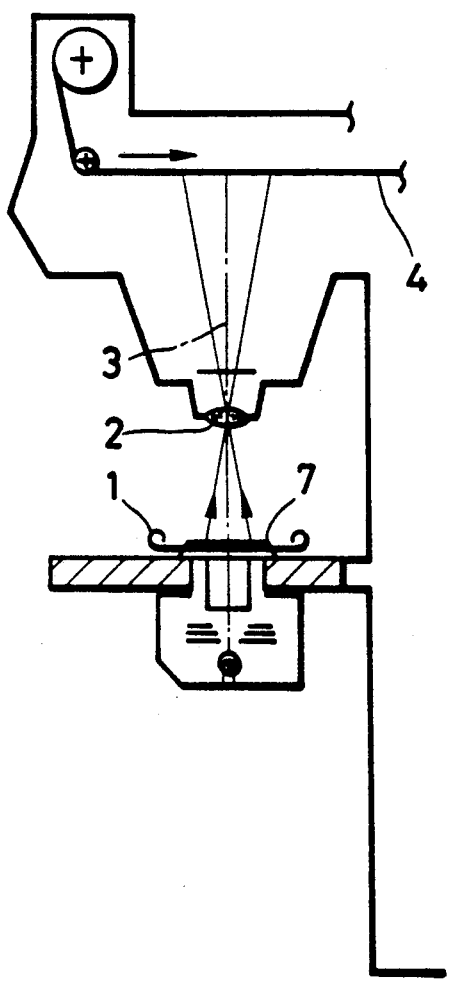
FIGS. 9 to 11 are schematic illustrations of conventional photographic printers.
Figure 10:
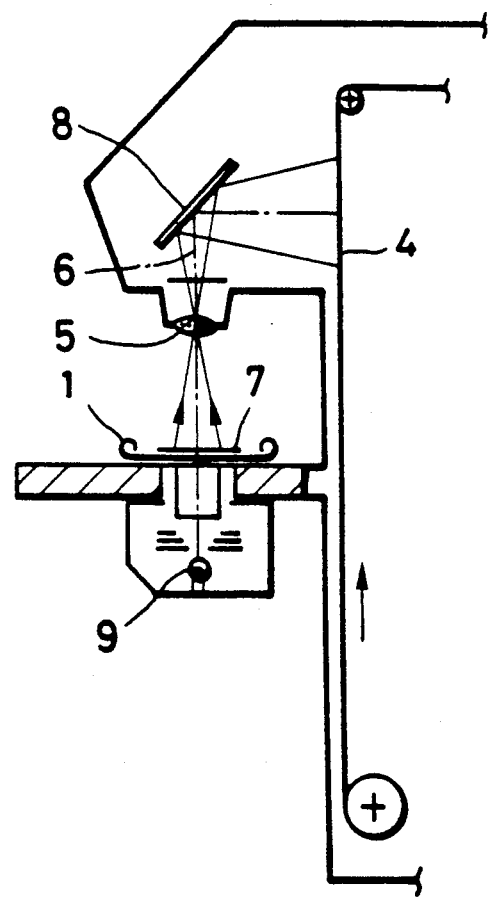
Figure 11:
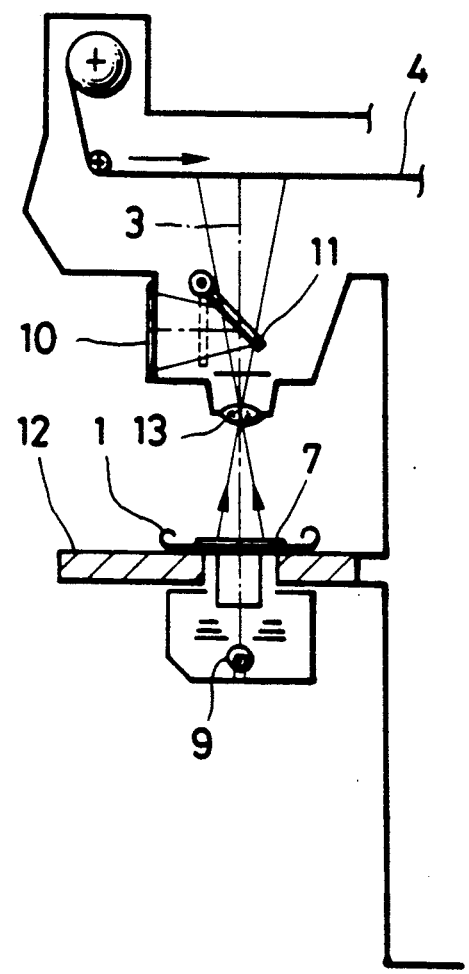

During photographic printing, the printing light is reflected twice by the flat mirror sections 50 and 51 so that the right and left sides of an image are reversed. As a result, it is unnecessary to set the negative film 34 upside down, unlike with the conventional photographic printer shown in FIG. 10 wherein the printing light is reflected by the flat reflection mirror. Specifically, the negative film 34 is set with its photosensitive emulsion layer facing upwardly, as in the case of the conventional photographic printer shown in FIG. 9 whose printing optical path is straight. Consequently, the set conditions of negative films can be made the same, thereby preventing defective prints caused by erroneous loading of a negative film. Further, since the photosensitive emulsion layer of the negative film 34 is directed upwardly so as to face color paper 96, there is no degradation of print quality as compared with a conventional reflect type photographic printer which sets the negative film while directing its photosensitive emulsion layer downwardly.

Figure 8:
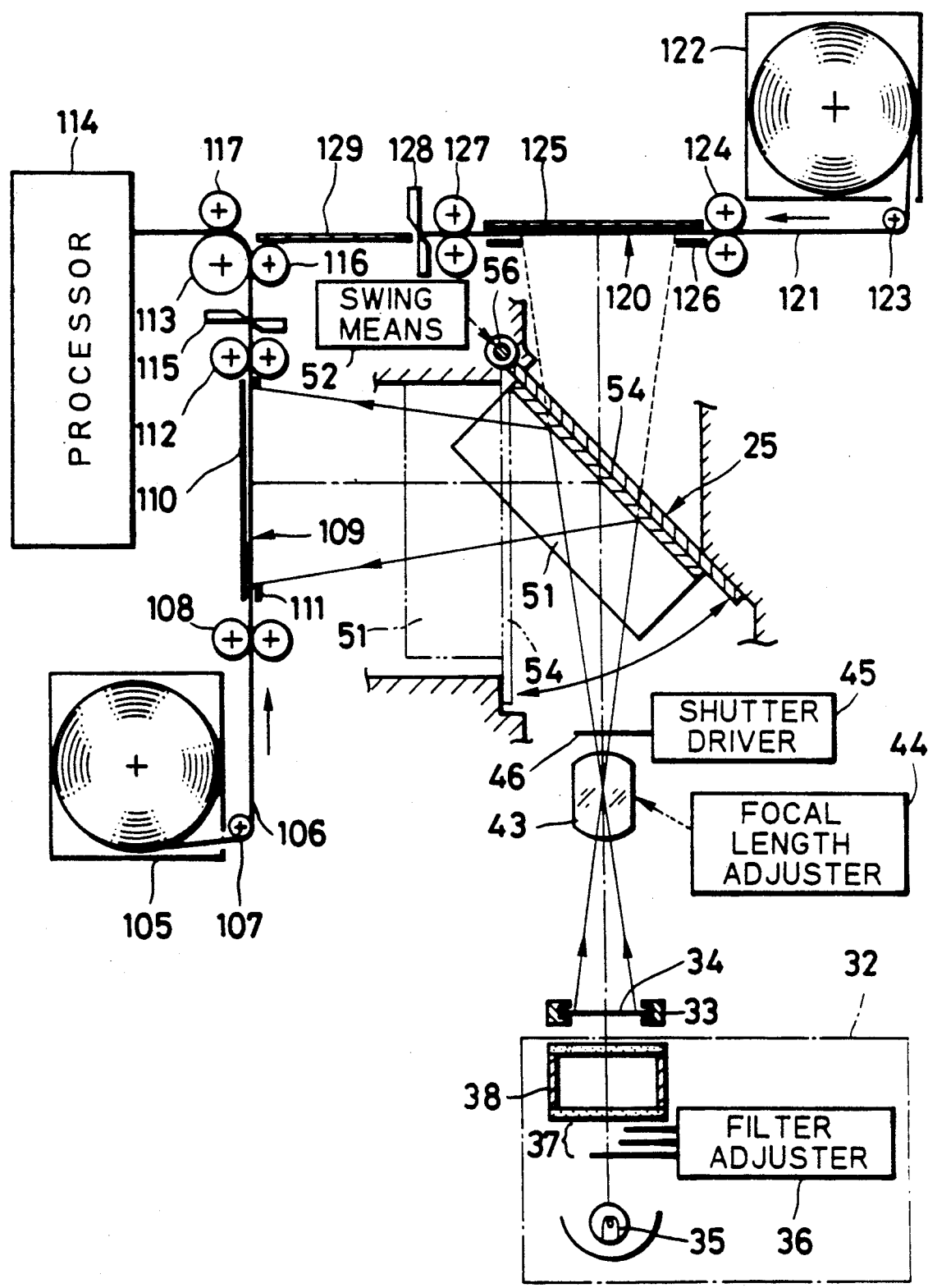
FIG. 8 is a schematic illustration of the photographic printer having two exposure stages according to the present invention.

FIG. 8 shows another embodiment of a photographic printer capable of selectively using two different sizes, or two different photographic characteristics of color papers. Similar elements to those shown in FIG. 1 are represented by using identical reference numerals. A color paper 106 drawn from a first magazine 105 is fed by a pair of feed rollers 108 via a guide roller 107. The feed roller pair 108 nips the color paper 106 and feeds it vertically upwardly to set the unexposed area at a first exposure station 109 which is provided with a plate 110 and a paper mask 111.

After the image in a frame of the negative film 34 has been printed at the first exposure station 109, the color paper 106 is advanced by one frame by a pair of feed rollers 112 to a cutting position provided with a cutter 115 whereby the exposed area of the color paper 106 is cut off. The cut-off sheet is fed to a processor 114 for a photographic developing process via a large roller 113. The large roller 113 operates in association with small rollers 116 and 117 to nip a sheet therebetween.

A horizontal second exposure station 120 is provided perpendicularly to the first exposure station 109. At this second exposure station 120, a color paper 121 is used for printing an image, this paper being of a different type from the color paper 106 housed within the first magazine 105. For example, the width size and photographic characteristic may be different. The second exposure section, including the second exposure station 120, has the same structure as that of the first exposure section including the first exposure station 109, so that description of the second exposure section will be omitted, except for provision of reference numerals. For example, reference numeral 129 represents a guide plate.

When a roof type mirror 25 is at the position indicated by a solid line, the first exposure section is selected to print a frame of the negative film 34 on the color paper 106. In this case, a holder of the roof type mirror 25 shields light from the second exposure section so that the color paper 121 is not exposed to light. When the roof type mirror 25 is rotated to the position indicated by a two-dot-chain line, the first exposure section is shielded to allow printing of a frame of the negative film 34 on the color paper 106.

Thus, it is possible to use two types of color papers. For example, if two types of color papers having a different width are used, photographic prints having different print sizes can be produced merely by rotating the roof type mirror 25. In this case, as the roof type mirror 25 moves, a focal length adjuster 44 operates correspondingly so that the focal length of the printing lens 43 can be changed with the print size.

Although the embodiment shown in FIG. 1 is a photographic printer, the monitor system of this invention also is applicable to a viewer for a micro-film reader or the like. Of course, although the present invention has been fully described by way of preferred embodiments thereof with reference to the accompanying drawings, various changes and modifications within the scope and spirit of the invention will be apparent to those of working skill in this technological field. Therefore, unless otherwise noted, such changes and modifications should be construed as included within the scope of the present invention as defined by the appended claims.

What is claimed is:

1. A photographic printer having an L-shaped printing optical path extending from a photographic film to a photosensitive material wherein an original image recorded in the photographic film is projected onto the photosensitive material via a printing lens, said photographic printer comprising:
    at least one printing station for printing said original image onto said photosensitive material; and
    roof type reflection means for reversing the right and left sides of an image, said roof type reflection means being disposed substantially at a 45 degree angle relative to the optical axis of said printing lens and causing an incident light thereto to reflect toward said photosensitive material, wherein said roof type reflection means comprises a prism which is a triangle pole having a right angled isosceles triangle section and having its opposing end surfaces cut off.

2. A photographic printer having an L-shaped printing optical path extending from a photographic film to a photosensitive material wherein an original image recorded in the photographic film is projected onto the photosensitive material via a printing lens, said photographic printer comprising:
    at least one printing station for printing said original image onto said photosensitive material; and
    roof type reflection means for reversing the right and left sides of an image, said roof type reflection means being disposed substantially at a 45 degree angel relative to the optical axis of said printing lens and causing an incident light thereto to reflect toward said photosensitive material, wherein said roof type reflection means comprises two prisms disposed side by side each having a triangle section, the opposing two planes of said two prisms forming a roof shape mirror surface of said roof type reflection means.

3. A photographic printer having an L-shaped printing optical path extending from a photographic film to a photosensitive material wherein an original image recorded in the photographic film is projected onto the photosensitive material via a printing lens, said photographic printer comprising:
    at least one printing station for printing said original image onto said photosensitive material; and
    roof type reflection means for reversing the right and left sides of an image, said roof type reflection means being disposed substantially at a 45 degree angle relative to the optical axis of said printing lens and causing an incident light thereto to reflect toward said photosensitive material, wherein said roof type reflection means comprises two rotatable flat mirrors, said two flat mirrors being displaced between substantially upright positions and a position where said two flat mirrors come into contact with each other at respective end portions.

4. A photographic printer wherein a photosensitive material is disposed parallel to a photographic film and an original image recorded in the photographic film is printed on the photosensitive material via a printing lens, said photographic printer comprising:
    a transparent monitor screen disposed substantially at a right angle relative to said photographic film;
    roof type reflection means for reversing the right and left sides of an image, said roof type reflection means being set at a first position during monitoring and at a second position during printing, wherein at said first position said roof type reflection means is disposed between said printing lens and said photosensitive material and slanted substantially at a 45 degree angle relative to the optical axis of said printing lens so as to reflect a light passed through said photographic film toward said monitor screen, and wherein at said second position said roof type reflection means is retracted from the optical axis of said printing lens so as not to obstruct a light passed through said photographic film from being directed to said photosensitive material: and
    driving means for driving and positioning said roof type reflection means at either said first or said second position.

5. A photographic printer according to claim 4, wherein said roof type reflection means comprises two flat mirrors disposed substantially at right angles to each other.

6. A photographic printer according to claim 4, wherein said roof type reflection means comprises a prism which is a triangle pole having a right angled isosceles triangle section and having its opposing end surfaces cut off.

7. A photographic printer according to claim 4, wherein said roof type reflection means comprises two prisms disposed side by side each having a triangle section, the opposing two planes of said two prisms forming a roof shape mirror surface of said roof type reflection means.

8. A photographic printer according to claim 4, wherein said roof type reflection means comprises two rotatable flat mirrors, said two flat mirrors being displaced between substantially upright positions and a position where said two flat mirrors come into contact with each other at respective end portions.

9. A photographic printer for printing an original image recorded in a photographic film on a photosensitive material via a printing lens, comprising:
    a first exposure station disposed perpendicular to said photographic film for printing an original image of said photographic film on a first photosensitive material;
    a second exposure station, disposed parallel to said photographic film, for printing an original image of said photographic film on a second photosensitive material;
    roof type reflection means for reversing the right and left sides of an image, said roof type reflection means being positioned variably at at least one of first and second positions, wherein at said first position said roof type reflection means is disposed substantially at a 45 degree angle relative to the optical axis of said printing lens so as to reflect a light passed through said photographic film toward said first exposure station, and wherein at said second position said roof type reflection means is retracted from the optical axis of said printing lens so as to allow a light passed through said photographic film to reach said second exposure station; and driving means for driving and positioning said roof type reflection means at either said first or said second position.

10. A photographic printer according to claim 9, wherein said roof type reflection means comprises two flat mirrors disposed substantially at right angles to each other.

11. A photographic printer according to claim 9, wherein said roof type reflection means comprises a prism which is a triangle pole having a right angled isosceles triangle section and having its opposing end surfaces cut off.

12. A photographic printer according to claim 9, wherein said roof type reflection means comprises two prisms disposed side by side each having a triangle section, the opposing two planes of said two prisms forming a roof shape mirror surface of said roof type reflection means.

13. A photographic printer according to claim 9, wherein said roof type reflection means comprises two rotatable flat mirrors, said two flat mirrors being displaced between substantially upright positions and a position where said two flat mirrors come into contact with each other at respective end portions.

* * * * *